United States Patent
Hiraiwa et al.

(10) Patent No.: US 11,938,471 B2
(45) Date of Patent: Mar. 26, 2024

(54) METAL POROUS BODY, WATER VAPOR REFORMER INCLUDING THE SAME, AND METHOD FOR MANUFACTURING METAL POROUS BODY

(71) Applicant: SUMITOMO ELECTRIC INDUSTRIES, LTD., Osaka (JP)

(72) Inventors: Chihiro Hiraiwa, Osaka (JP); Naho Mizuhara, Osaka (JP); Mitsuyasu Ogawa, Osaka (JP); Takahiro Higashino, Osaka (JP); Hiromasa Tawarayama, Osaka (JP); Masatoshi Majima, Osaka (JP); Yoshitaka Ogasawara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 278 days.

(21) Appl. No.: 17/265,909

(22) PCT Filed: Jun. 21, 2019

(86) PCT No.: PCT/JP2019/024664
§ 371 (c)(1),
(2) Date: Feb. 4, 2021

(87) PCT Pub. No.: WO2020/054170
PCT Pub. Date: Mar. 19, 2020

(65) Prior Publication Data
US 2021/0162393 A1 Jun. 3, 2021

(30) Foreign Application Priority Data

Sep. 14, 2018 (JP) .................................. 2018-172252

(51) Int. Cl.
*B01J 37/02* (2006.01)
*B01J 23/46* (2006.01)
(Continued)

(52) U.S. Cl.
CPC ......... *B01J 37/0244* (2013.01); *B01J 23/462* (2013.01); *B01J 23/75* (2013.01); *B01J 23/755* (2013.01); *B01J 35/1066* (2013.01); *B01J 35/1071* (2013.01); *B01J 35/1076* (2013.01); *B01J 37/0018* (2013.01); *C01B 3/38* (2013.01); *C01B 2203/0233* (2013.01); *C01P 2006/16* (2013.01)

(58) Field of Classification Search
None
See application file for complete search history.

(56) References Cited

U.S. PATENT DOCUMENTS

| 2006/0175741 A1 | 8/2006 | Kawasaki et al. |
| 2013/0295459 A1 | 11/2013 | Nishimura et al. |
| 2017/0098841 A1 | 4/2017 | Higashino et al. |

FOREIGN PATENT DOCUMENTS

| JP | H06-248492 A | 9/1994 |
| JP | 2002-28490 A | 1/2002 |

(Continued)

*Primary Examiner* — Colin W. Slifka
(74) *Attorney, Agent, or Firm* — Oliff PLC (57) ABSTRACT

A metal porous body has a skeleton of a three-dimensional network structure, an outer layer portion of the skeleton having a second pore smaller in size than a first pore formed by the skeleton, wherein the outer layer portion is a metal layer, and a water vapor reforming catalyst is supported in the outer layer portion.

12 Claims, 6 Drawing Sheets

(51) Int. Cl.
*B01J 23/75* (2006.01)
*B01J 23/755* (2006.01)
*B01J 35/10* (2006.01)
*B01J 37/00* (2006.01)
*C01B 3/38* (2006.01)

(56) References Cited

FOREIGN PATENT DOCUMENTS

| | | |
|---|---|---|
| JP | 2004-57869 A | 2/2004 |
| JP | 2004-223505 A | 8/2004 |
| JP | 2011-194340 A | 10/2011 |
| JP | 2012-41608 A | 3/2012 |
| JP | 2012-214879 A | 11/2012 |
| WO | 2004/083148 A1 | 9/2004 |
| WO | 2012/098941 A1 | 7/2012 |

METAL POROUS BODY, WATER VAPOR REFORMER INCLUDING THE SAME, AND METHOD FOR MANUFACTURING METAL POROUS BODY

TECHNICAL FIELD

The present disclosure relates to a metal porous body, a water vapor reformer including the same, and a method for manufacturing the metal porous body. The present application claims the priority to Japanese Patent Application No. 2018-172252 filed on Sep. 14, 2018, the entire contents of which are incorporated herein by reference.

BACKGROUND ART

In a purification apparatus for exhaust gas produced through the use of an internal combustion engine, a boiler or a chemical reaction device, or a reformer used in a fuel cell, a catalyst is used to promote a desired chemical reaction. The catalyst is supported in a catalyst support. Examples of properties required for the catalyst support include heat resistance, corrosion resistance, impact resistance, a surface area and the like. A catalyst support made of ceramics and having a honeycomb structure is mainly used because of its excellent heat resistance and corrosion resistance.

According to PTL 1, a honeycomb structure made of a porous material is proposed, the porous material being obtained by bonding silicon carbide particles as an aggregate with silicon nitride as a binder, in a state where pores are retained between the silicon carbide particles. The honeycomb structure is configured to have a plurality of cells as gas flow paths partitioned by a partition wall, and have a catalyst supported in the partition wall.

CITATION LIST

Patent Literature

PTL 1: International Publication No. 2004/083148

SUMMARY OF INVENTION

A metal porous body according to one aspect of the present disclosure is a metal porous body having a skeleton of a three-dimensional network structure, an outer layer portion of the skeleton having second pores smaller in size than first pores formed by the skeleton, wherein the outer layer portion is a metal layer, and a water vapor reforming catalyst is supported in the outer layer portion.

A water vapor reformer according to one aspect of the present disclosure includes: a reaction chamber where a gas containing hydrocarbon is reacted with a water vapor to produce a reforming gas containing hydrogen; and the above-described metal porous body, wherein the metal porous body is housed in the reaction chamber.

A method for manufacturing a metal porous body according to one aspect of the present disclosure is a method for manufacturing the above-described metal porous body, the method including: a first plating step of plating a template having a three-dimensional network structure with a first metal; a second plating step of plating the template subjected to the first plating step with a second metal; in the first plating step and/or the second plating step, attaching microspheres to a surface of the template together with the first metal or the second metal; removing the microspheres and the template, to form a metal porous body; and supporting a water vapor reforming catalyst in a surface of the metal porous body.

DETAILED DESCRIPTION

Problem to be Solved by the Present Disclosure

The conventionally used catalyst support is made of ceramics, and thus, is low in impact resistance. Therefore, the catalyst support should be made thick to some extent in order to ensure strength, which results in a high pressure loss.

When a catalyst support having a honeycomb structure is used, like the porous material described in PTL 1, a gas flowing through the cell centers cannot come into contact with the catalyst, and thus, the unreacted gas may be discharged.

Advantageous Effect of the Present Disclosure

According to the present disclosure, there can be provided a metal porous body having a three-dimensional network-like skeleton and having excellent impact resistance. In addition, by using the above-described metal porous body, there can be provided a water vapor reformer having excellent conversion efficiency in converting a hydrocarbon gas into hydrogen.

Description of Embodiment of the Present Disclosure

First, each aspect of the present disclosure will be described.

(1) A metal porous body according to one aspect of the present disclosure has a skeleton of a three-dimensional network structure, and an outer layer portion of the skeleton has second pores smaller in size than first pores formed by the skeleton. The outer layer portion is a metal layer, and a water vapor reforming catalyst is supported in the outer layer portion.

According to the above-described aspect of the present disclosure, the metal porous body is excellent in impact resistance because at least the outer layer portion of the skeleton is formed of metal. In addition, the second pores are formed in the outer layer portion of the skeleton, which makes it possible to achieve a very large surface area while maintaining the impact resistance. The metal layer may be a metal plated layer formed by plating treatment.

The second pores may only be formed in at least the outer layer portion of the skeleton. This makes it possible to increase the surface area while suppressing a reduction in strength. "Outer layer portion" refers to a portion extending from an outer surface of the skeleton to a predetermined depth shorter than a thickness of the skeleton in a thickness direction of the skeleton.

When the second pores are also formed in an inner layer portion of the skeleton, which is a portion of the skeleton other than the outer layer portion, the metal porous body can be reduced in weight.

In order to maintain the strength of the metal porous body, the second pores are preferably formed only in a range from the surface to a depth of D/4 in the thickness direction of the skeleton, where D represents the thickness of the skeleton.

As described below, the metal porous body may in some cases have a cavity (hollow portion) within the skeleton. In this case, thickness D of the skeleton refers to a thickness not including the hollow portion and ranging from the outer surface of the skeleton to an inner surface that faces the hollow portion.

By supporting the water vapor reforming catalyst in the outer layer portion, and particularly the second pores, of the skeleton of the metal porous body, the catalyst-supporting metal porous body excellent in hydrogen conversion efficiency is obtained. Since the metal porous body has the skeleton of the three-dimensional network structure, the number of times of collision between gas molecules and the water vapor reforming catalyst increases, and thus, discharge of unreacted gas caused by non-contact between a part of gas and the catalyst is suppressed.

When the metal porous body having the water vapor reforming catalyst supported therein is particularly mentioned in the following description, such metal porous body is clearly denoted as "catalyst-supporting metal porous body" and is distinguished from the metal porous body before supporting the catalyst. The simple expression of "metal porous body" refers to both the metal porous body having the water vapor reforming catalyst supported therein and the metal porous body before supporting the water vapor reforming catalyst.

The second pores preferably have a spherical or hemispherical shape. This prevents stress from concentrating on the vicinity of the micropores, and thus, a reduction in strength caused by formation of the second pores can be suppressed. "Spherical or hemispherical shape" does not refer to a mathematically strict spherical or hemispherical shape, and may have some roughness, or may include a portion having a non-constant curvature. In addition, a surface having a substantially constant curvature may be formed at an arbitrary solid angle.

In addition, a surface of the metal porous body is formed of metal, and thus, the metal porous body has a sufficient porosity and has electrical conductivity. Therefore, when the metal porous body is used for hydrogen production in a fuel cell, the catalyst-supporting metal porous body may be used as an anode-side current collector of the fuel cell. Alternatively, the catalyst-supporting metal porous body may be arranged at an arbitrary position on the anode side of the fuel cell. Thus, production of hydrogen from a hydrocarbon gas and a power generation reaction can be both completed in a fuel cell unit.

(2) Preferably, the metal layer includes Ni, which is a first metal. Thus, the catalyst-supporting metal porous body excellent in heat resistance is obtained. The catalyst-supporting metal porous body can be suitably used for water vapor reforming for obtaining fuel hydrogen for a solid oxide fuel cell (SOFC).

Specific examples of the SOFC include, for example, a configuration in which oxygen-ion-conductive Yttria-stabilized zirconia (YSZ) is used as a solid electrolyte. However, an operation temperature of the SOFC including YSZ is as high as 750° C. to 1000° C., and thus, an SOFC that operates at a lower temperature, i.e., 600° C. to 800° C. or 400° C. to 600° C. is under development. Since perovskite oxides such as $BaCe_{0.8}Y_{0.2}O_{2.9}$ (BCY) and $BaZr_{0.8}Y_{0.2}O_{2.9}$ (BZY) exhibit high proton conductivity in an intermediate temperature range of 400° C. to 600° C., the perovskite oxides are expected as a solid electrolyte for an intermediate temperature-type fuel cell.

As described above, the operation temperature of the SOFC is as high as 400° C. or higher at minimum.

In terms of energy efficiency, a reaction temperature of a water vapor reformer used in an SOFC is preferably at the same level as the operation temperature of the SOFC. In view of catalytic activity, the reaction temperature of the water vapor reformer is preferably equal to or higher than 600° C.

Therefore, a porous catalyst support having heat resistance to 600° C. or higher, having excellent impact resistance, and having a skeleton developed in a three-dimensional network manner is desired for use in water vapor reforming for an SOFC.

The metal porous body according to the above-described aspect is a porous body having high heat resistance and impact resistance and having a skeleton of a three-dimensional network structure. Therefore, by using the catalyst-supporting metal porous body for water vapor reforming, an SOFC having high energy efficiency can be achieved.

In addition, Ni is a material used in an anode of an SOFC. Therefore, when the catalyst-supporting metal porous body is used as the anode-side current collector of the fuel cell unit or when the catalyst-supporting metal porous body is arranged on the anode side of the fuel cell unit, Ni has a high affinity for the anode.

(3) Preferably, in (2), the metal layer further includes a second metal, and the second metal includes at least one selected from the group consisting of Sn and Cr. By including Sn or Cr, the corrosion resistance of the metal porous body can be improved.

(4) Preferably, in (3), the metal layer includes an alloy layer of the first metal and the second metal, and a first phase and a second phase coexist in the alloy layer, the first phase and the second phase being different in concentration of the second metal with respect to the first metal. Herein, the concentration of the second metal in the first phase is higher than the concentration of the second metal in the second phase.

As described below, the skeleton may be formed by performing plating treatment at least twice to include a first plated layer including the first metal and a second plated layer including the second metal. In this case, the second plated layer covers at least a part of a surface of the first plated layer. However, when a thickness of the second plated layer is smaller than a thickness of the first plated layer, the metal porous body coated with the second plated layer is subjected to heat treatment under a reducing atmosphere, such that the second metal in the second plated layer can diffuse into the first plated layer and the first metal in the first plated layer can diffuse into the second plated layer, and thus, a region extending from the surface of the skeleton to a certain depth can be changed into the alloy layer of the first metal and the second metal. Especially, an Ni—Sn alloy and an Ni—Cr alloy have high corrosion resistance. Thus, the corrosion resistance of the metal porous body can be improved.

A first phase having a high concentration of Sn (Cr) with respect to Ni and a second phase having a concentration of Sn (Cr) with respect to Ni lower than that of the first phase may coexist in an Ni—Sn alloy layer (or an Ni—Cr alloy layer). When the second metal is Sn, Ni and Sn exist in the form of an intermetallic compound (e.g., $Ni_3Sn$) in the first phase. It is conceivable that the second phase is mainly composed of Ni and includes Sn existing in Ni in a solid solution state. Of the above-described first and second phases, the first phase that is an intermetallic compound phase has higher corrosion resistance than that of the second phase.

Therefore, as a ratio of the first phase to a total of the first phase and the second phase in the metal skeleton becomes higher, the metal porous body has more excellent corrosion resistance. However, as the ratio of the first phase becomes higher, the heat resistance becomes lower and the electrical conductivity of the metal porous body becomes lower.

As to a composition ratio between Ni and Sn in the Ni—Sn alloy layer, in order to increase the corrosion resistance, a ratio of Sn included in the alloy layer is preferably equal to or more than 4 mass %, and more preferably equal to or more than 5 mass %, with a total amount of Ni and Sn being 100 mass %. However, in order to maintain high heat resistance and electrical conductivity, the ratio of Sn included in the alloy layer is preferably equal to or less than 15 mass %, and more preferably equal to or less than 10 mass %, with the total amount of Ni and Sn included in the Ni—Sn layer being 100 mass %. When Sn is included in the Ni—Sn alloy layer at the composition ratio that satisfies the above-described condition, the two phases, i.e., the intermetallic compound phase (first phase) mainly composed of $Ni_3Sn$ and the phase (second phase) mainly composed of Ni and including Sn existing in Ni in a solid solution state, are observed in the Ni—Sn alloy layer. Since the first phase and the second phase coexist, high corrosion resistance, high heat resistance, and excellent electrical conductivity can be ensured in the metal porous body.

The entire skeleton of the three-dimensional network structure may be formed of the alloy layer of the first metal and the second metal.

At least one of the first plated layer and the second plated layer may be formed by plating with an Ni—Sn alloy. In other words, the first plated layer may be an Ni-plated layer, or may be an Ni—Sn alloy-plated layer. The second plated layer may be an Sn-plated layer, or may be an Ni—Sn alloy-plated layer. When both the first plated layer and the second plated layer include Sn, the layers may be different in content of Sn. In this case, the metal plated layer has an Sn concentration distribution inclined across an interface between the first plated layer and the second plated layer.

A content of Ni included in the first plated layer is preferably equal to or more than 80 mass %, and more preferably equal to or more than 95 mass %, with a total amount of the first plated layer being 100 mass %. A content of Ni included in the metal plated layer including the first plated layer and the second plated layer is preferably equal to or more than 60 mass %, and more preferably equal to or more than 90 mass %, with a total amount of the metal plated layer being 100 mass %.

The content ratios of the first metal and the second metal included in the metal layer of the metal porous body can be measured by inductively coupled plasma (ICP) emission spectroscopy.

Specifically, a part of the metal porous body is taken out, and heated and melted under addition of boron oxide and sodium carbonate. The sample is cooled and dissolved in hydrochloric acid. An insoluble is removed by filtration. The solution is measured using an ICP emission spectrometer (e.g., ICPS-8100 manufactured by Shimadzu Corporation).

(5) Preferably, a porosity of the metal porous body is 70 to 98%. The catalyst-supporting metal porous body having the above-described porosity is suitable for use as a water vapor reformer for an SOFC. Since the porosity is equal to or more than 70%, a water vapor reforming reaction can be efficiently performed. In addition, in terms of strength, the porosity is preferably equal to or less than 98%. For example, when the entire skeleton of the metal porous body is formed of the Ni—Sn alloy layer, an Ni/Sn ratio can be obtained by ICP emission spectroscopy and a true specific gravity of the alloy layer can be specified based on the Ni/Sn ratio. The porosity is obtained in accordance with 1−(apparent specific gravity of metal porous body/true specific gravity of metal). The porosity may be calculated by obtaining a volume of the pores using a mercury intrusion method.

(6) Preferably, the first pores have a pore size of 100 μm to 4000 μm. More preferably, the first pores may have a pore size of 300 μm to 1000 μm. The catalyst-supporting metal porous body having the above-described first pores is suitable for use as a water vapor reformer for an SOFC.

The pore size of the first pores is obtained as described below.

First, one arbitrary pore (first pore) is selected from the metal porous body, and a diameter of a maximum sphere that can be housed in the first pore and a diameter of a minimum sphere S that can be housed in the first pore are measured, and an average value thereof is defined as a pore size of the selected first pore. Similarly, pore sizes of the other arbitrary first pores (e.g., nine first pores) are obtained, and an average value of the pore sizes of the ten first pores is defined as a pore size of the first pores in the metal porous body.

Specifically, in an SEM photograph of the metal porous body, a region V including ten or more first pores is determined. The predetermined number of the first pores (e.g., ten first pores) in region V are randomly selected and pore sizes thereof are obtained. An average value of the calculated pore sizes of the first pores is obtained and defined as the pore size of the first pores in the metal porous body.

When the first pores have a specific aspect ratio, not a true spherical shape, the pore size of the first pores refers to a numerical value of a pore size measured from a direction where the measured pore size is the largest pore size.

(7) Preferably, the second pores have a pore size of 0.2 μm to 20 μm. The catalyst-supporting metal porous body having the above-described second pores is suitable for use as a water vapor reformer for an SOFC.

As the pore size of the second pores becomes smaller, the surface area of the skeleton becomes larger, and thus, a water vapor reforming reaction through the catalyst arranged in the second pores is promoted. In order to promote a catalytic reaction, the pore size of the second pores is preferably equal to or less than 20 μm. However, when the pore size of the second pores is small, carbon (C) produced as a result of the water vapor reforming reaction fills the second pores, which is likely to cause a fracture in the skeleton of the metal porous body. Deposition of carbon (C) is more likely to occur as the reaction temperature of water vapor reforming becomes lower and the catalytic activity becomes lower. In order to suppress a crack caused by deposited carbon, the pore size of the second pores is preferably equal to or more than 0.2 µm. The pore size of the second pores is more preferably equal to or more than 0.4 µm, and further preferably equal to or more than 0.5 µm. In addition, the pore size of the second pores is more preferably equal to or less than 10 µm, and further preferably equal to or less than 5 µm. The above-described upper limit and lower limit can be arbitrarily combined.

The pore size of the second pores can be obtained using a method similar to that of the first pores.

(8) Preferably, the water vapor reforming catalyst includes a metal catalyst including Ni, and a support supporting the metal catalyst, and the support is $LaNbO_4$ or $La_{1-x}Sr_xNbO_4$ ($0<x\leq0.12$). More preferably, the metal catalyst further includes at least one selected from the group consisting of Co and Ru.

As the water vapor reforming catalyst, a conventionally used catalyst can be selected, depending on the hydrocarbon gas to be reformed. The water vapor reforming catalyst is used in a state where a component having the catalytic action is supported in the support. Examples of the component having the catalytic action include a platinum group element such as Pt, Ru or Rh, or a transition metal element having the catalytic action such as Ni. Alumina ($Al_2O_3$), zirconia ($ZrO_2$), cordierite ($2MgO \cdot 2Al_2O_3 \cdot 5SiO_2$) or the like is, for example, used as the support.

Especially, a catalyst (hereinafter, referred to as "LNO-supported Ni catalyst" or "LSNO-supported Ni catalyst" as appropriate, and $LaNbO_4$ and $La_{1-x}Sr_xNbO_4$ may be referred to as "LNO" and "LSNO", respectively) obtained by supporting an Ni-containing catalytic metal in $LaNbO_4$ or $La_{1-x}Sr_xNbO_4$ ($0<x\leq0.12$) is preferable because the catalyst has high catalytic activity in a water vapor reforming reaction even at intermediate and low temperatures of less than 700° C. In the LSNO-supported Ni catalyst, a composition ratio x of Sr is more preferably $0.8\leq x\leq 1.2$.

Furthermore, by using a catalyst mainly composed of Ni and further including two or more types of mixed catalytic metals including at least one selected from the group consisting of Co and Ru, among the LNO-supported Ni catalyst and the LSNO-supported Ni catalyst, the catalytic activity at intermediate and low temperatures improves greatly. By using this catalyst, water vapor reforming can be performed at a temperature of 600° C. or lower, and an amount of energy consumption required to heat the reformer to a temperature exceeding 600° C. can be reduced. A content of the catalytic metal including Ni and Co and/or Ru is preferably 1 to 5 mass % with respect to 100 mass % of a total of the catalytic metal and the support LNO or LNSO. In addition, a content of Co and/or Ru is preferably 0.15 to 0.5 mass % with respect to 100 mass % of the total of the catalytic metal and the support LNO or LNSO. Thus, it is possible to obtain a high rate of conversion from hydrocarbon while keeping an amount of production of carbon low.

(9) A water vapor reformer according to one aspect of the present disclosure includes: a reaction chamber where a gas containing hydrocarbon is reacted with a water vapor to produce a reforming gas containing hydrogen; and the above-described catalyst-supporting metal porous body, wherein the catalyst-supporting metal porous body is housed in the reaction chamber.

The use of the catalyst-supporting metal porous body makes it possible to achieve a water vapor reformer that can promote a reforming reaction even at a high temperature of 600° C. or higher and has high reaction efficiency and excellent conversion efficiency in converting a hydrocarbon gas to hydrogen.

(10) A reaction temperature of a water vapor reforming reaction is preferably 600° C. to 800° C., and thus, the water vapor reformer can be used for hydrogen production in an SOFC that operates at intermediate and low temperatures of 600° C. to 800° C. By setting the reaction temperature of the water vapor reformer at the same level as the operation temperature of the SOFC, the energy efficiency can be increased.

(11) A method for manufacturing a metal porous body according to one aspect of the present disclosure is a method for manufacturing the above-described catalyst-supporting metal porous body, the method including:

a first plating step of plating a template having a three-dimensional network structure with a first metal;

a second plating step of plating the template subjected to the first plating step with a second metal;

in the first plating step and/or the second plating step, attaching microspheres to a surface of the template together with the first metal or the second metal;

removing the microspheres and the template, to form a metal porous body; and supporting a water vapor reforming catalyst in a surface of the metal porous body.

According to the above-described manufacturing method, the catalyst-supporting metal porous body having excellent heat resistance and impact resistance and having the three-dimensional network-like skeleton can be manufactured.

The above-described manufacturing method includes the two plating steps and the step of attaching the microspheres in at least one of the first plating step and the second plating step. Thereafter, the microspheres are removed to form micropores in the portion where the microspheres are removed. The micropores serve as the second pores in the above-described metal porous body. Therefore, the pore size of the second pores can be controlled to a certain extent, based on a size of the microspheres. The skeleton of the metal porous body and the first pores are formed of the first metal, and the outer layer portion of the skeleton is formed of the second metal. At least a part of surfaces of the second pores are formed of the second metal.

The microspheres do not necessarily need to have a mathematically strict spherical shape, and may have an elliptical spherical shape, or may have some roughness on surfaces thereof. The microspheres may include a portion having a non-constant curvature.

The step of attaching the microspheres may be performed in the first plating step, or may be performed in the second plating step. The microspheres may be attached in both the first plating step and the second plating step. The first metal and the second metal may be the same as each other, or may be different from each other. Preferably, Ni plating can be performed in, for example, the first plating step. In addition, preferably, Sn plating or Cr plating is performed in the second plating step, and thus, the corrosion resistance can be increased.

(12) The attaching microspheres can be performed in the second plating step. In this case, the layer of the first metal (first plated layer) forms the skeleton of the metal porous body, and the second pores are formed only in the layer of the second metal (second plated layer). In order to achieve both high mechanical strength and large surface area, the second pores may be formed only in the range from the surface to the depth of D/4, where D represents the thickness of the skeleton, as described above. Therefore, the thickness of the second plated layer may be equal to or less than one-third of the thickness of the first plated layer.

(13) The attaching microspheres can also be performed in the first plating step, and the second plating step can also be performed after the removing the microspheres. In this case, the layer of the second metal (second plated layer) is formed to coat inner wall surfaces of the micropores (second pores) formed by removal of the microspheres. Therefore, as compared with the case of attaching the microspheres in the second plating step, the pore size of the second pores becomes smaller by the thickness of the second plated layer.

When the microspheres are attached in the second plating step, the layer of the first metal (first plated layer) may in some cases be exposed on the surfaces of the micropores (second pores) formed by removal of the microspheres. In contrast, when the microspheres are attached in the first plating step and the microspheres are not attached in the second plating step, the almost entire surfaces of the second pores are formed of the second metal and the first plated layer is hardly exposed.

Therefore, when the second plating step is plating treatment that uses, for example, Sn or Cr as the second metal to increase the corrosion resistance, it is preferable to attach microspheres in the first plating step and not to attach the microspheres in the second plating step such that the entire surfaces of the second pores are plated with the second metal, in order to improve the corrosion resistance.

When the microspheres are attached in the first plating step, the thickness of the first plated layer in the first plating step is preferably larger than a size of the microspheres such that a part of the surface of the template is not exposed when the microspheres are removed.

(14) Furthermore, preferably, in the forming a metal porous body, heat treatment is performed under a reducing atmosphere, to form an alloy layer of the first metal and the second metal on at least an outer layer of the metal porous body. By the heat treatment under a reducing atmosphere, a first metal element in the first plated layer may diffuse into the second plated layer, and the alloy layer of the first metal and the second metal may be formed on at least the outer layer of the metal porous body. The alloy layer may have high corrosion resistance and high heat resistance.

Details of Embodiment of the Present Disclosure

Specific examples of an embodiment of the present disclosure will be described hereinafter with reference to the drawings as appropriate. It should be noted that the present invention is not limited to these examples; rather, it is defined by the appended claims, and is intended to include any modifications within the scope and meaning equivalent to the terms of the claims.

(Metal Porous Body)

A metal porous body has a skeleton of a three-dimensional network structure, and first pores are formed by the network structure of the skeleton. At least an outer layer portion of the skeleton is plated with metal, and the outer layer portion has second pores. A water vapor reforming catalyst is supported in the outer layer portion. The water vapor reforming catalyst can be supported in the second pores of the outer layer portion.

The three-dimensional network-like skeleton may be, for example, a skeleton similar to a nonwoven fabric-like structure or a sponge-like structure, and may have a plurality of pores (first pores) defined by the skeleton. In the metal porous body, the above-described skeleton made of metal and the first pore surrounded by the skeleton form one cell.

Figure 1:
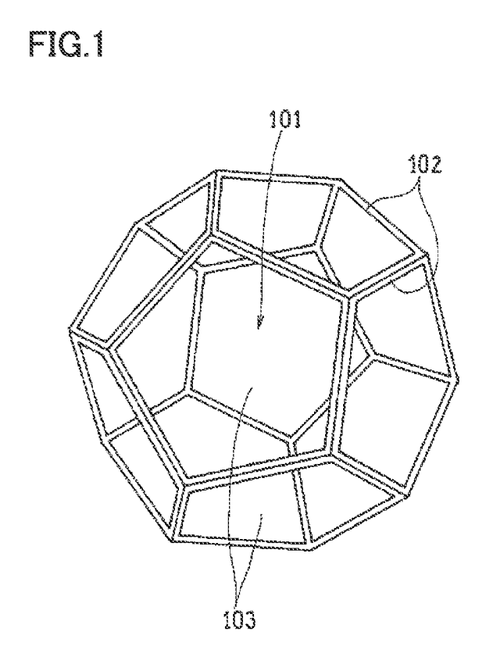
FIG. 1 is a schematic view showing an example structure of a part of a skeleton of a metal porous body.

One cell may be illustrated as a regular dodecahedron model, as in FIG. 1, for example. In this model, a pore (first pore) 101 is defined by fiber- or rod-shaped metal members (fiber members 102). The skeleton of a cell is formed of a plurality of fiber members 102 that are connected to each other in a three-dimensional manner. The cell has substantially-pentagonal openings (or windows) 103 each defined by fiber members 102. Adjacent cells share one opening 103 through which they communicate with each other. In other words, the skeleton of the metal porous body is formed of fiber members 102 that define the plurality of connected first pores 101 and extend like a network. The skeleton of this structure is called a three-dimensional network-like skeleton.

Figure 2:
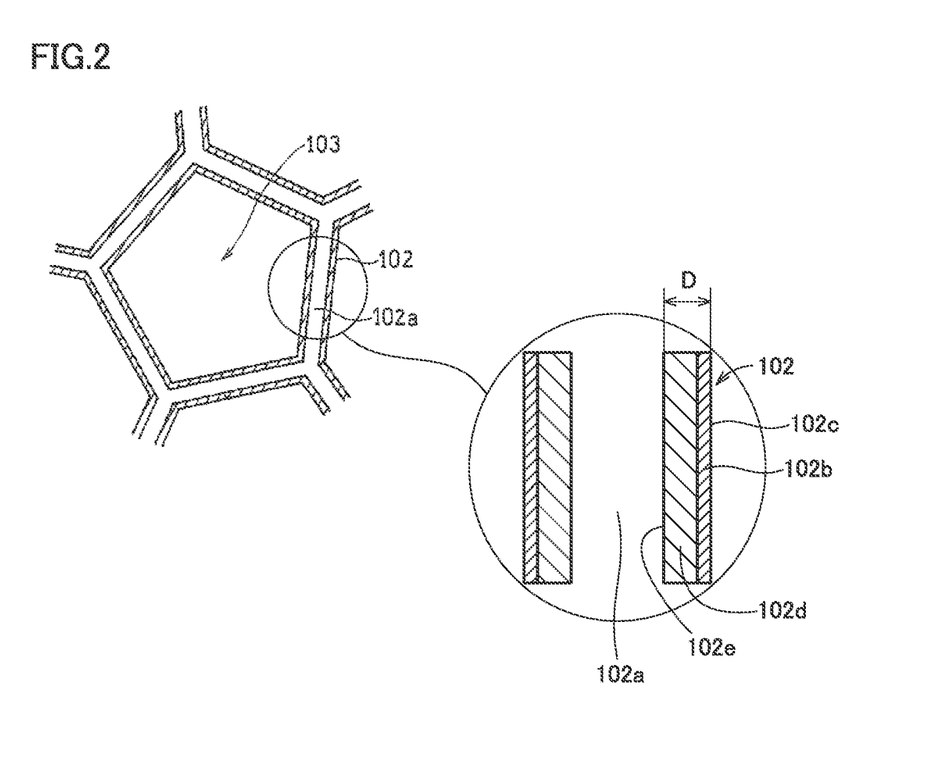
FIG. 2 is a cross-sectional view schematically showing a cross section of the part of the skeleton in FIG. 1.

As shown in a cross-sectional view in FIG. 2, fiber members 102 may have cavities (hollow portions 102a) inside thereof; in other words, fiber members 102 may be hollow. The metal porous body having a hollow skeleton (fiber members 102) has a bulky three-dimensional structure but it is very light.

In addition, as shown in a partially enlarged view enclosed with a circle in FIG. 2, an outer layer portion 102b of the skeleton is a portion extending from an outer surface 102c of the skeleton to a predetermined depth shorter than a thickness D of the skeleton in a thickness D direction of the skeleton. An inner layer portion 102d of the skeleton is a portion of the skeleton other than outer layer portion 102b.

As shown in FIG. 2, when the metal porous body has hollow portion 102a within the skeleton, thickness D of the skeleton refers to a thickness not including hollow portion 102a and ranging from outer surface 102c of the skeleton to an inner surface 102e that faces hollow portion 102a.

Figure 3:
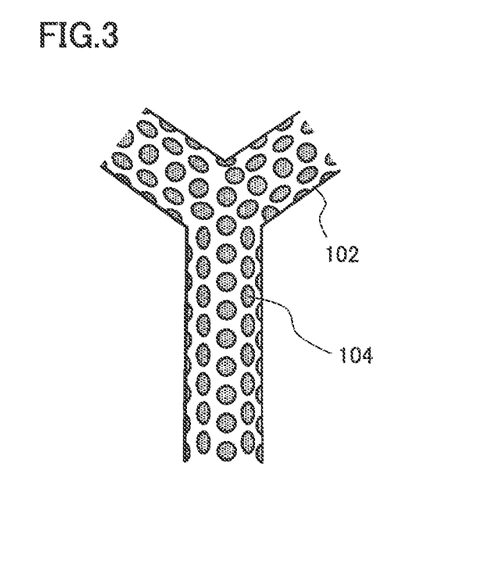
FIG. 3 is an enlarged schematic view showing a surface of the part of the skeleton in FIG. 1.

FIG. 3 is an enlarged schematic view of fiber member 102 in FIG. 1. As shown in FIG. 3, second pores 104 are formed in a surface of fiber member 102. A water vapor reforming catalyst is supported in second pores 104.

For example, the metal porous body may be formed by coating a resin porous body having communicating holes with metal. The metal coating may be performed by a plating treatment method, vapor phase processes (such as evaporation, plasma chemical vapor deposition, sputtering), and/or metal paste application, for example. By the metal coating treatment, the three-dimensional network-like skeleton is formed. Among these coating methods, the plating treatment method is preferably used as the metal coating.

The plating treatment method may be any plating treatment method capable of forming a metal layer on the surface of the resin porous body (including the surfaces of the voids inside), and a known plating treatment method such as electrolytic plating and/or molten salt plating may be employed. By the plating treatment method, a three-dimensional network-like metal porous body that reflects the shape of the resin porous body is formed. That is, a pore size of the first pores of the obtained metal porous body can be controlled based on a pore size of the resin porous body.

(Water Vapor Reforming Catalyst)

As the water vapor reforming catalyst, a conventionally used catalyst, e.g., a platinum group element such as Pt, Ru or Rh, or a transition metal element such as Ni, may be selected, depending on a hydrocarbon gas to be reformed. The water vapor reforming catalyst preferably includes a metal catalyst having the catalytic action, and a support supporting the metal catalyst.

Particularly, the LNO-supported Ni catalyst and the LSNO-supported Ni catalyst as described above, and especially, the LNO-supported Ni catalyst and the LSNO-supported Ni catalyst mainly composed of Ni and including two or more types of mixed catalytic metals, have sufficient catalytic activity even at a temperature of 600° C. or lower, and can be suitably used in an SOFC that operates in a temperature range of 600° C. to 800° C. The LNO-supported Ni catalyst and the LSNO-supported Ni catalyst can also be used in an SOFC that operates in a lower temperature range of 400° C. to 600° C. It is preferable to include Co or Ru, in addition to Ni, as the catalytic metal.

$LaNbO_4$ or $La_{1-x}Sr_xNbO_4$ serving as the support can be synthesized using a solid phase method such as a solid phase synthesis method. Specifically, when the solid phase synthesis method is used, synthesis can be performed by, for example, mixing $La_2O_3$, $Nb_2O_5$ and SrO and subjecting the mixture to heat treatment. A liquid phase method may also be used, and synthesis may be performed by sintering.

In addition to $LaNbO_4$ and $La_{1-x}Sr_xNbO_4$, alumina ($Al_2O_3$), zirconia ($ZrO_2$), cordierite ($2MgO \cdot 2Al_2O_3 \cdot 5SiO_2$) or the like can, for example, be used as the support.

An evaporation to dryness method can, for example, be used to support the catalytic metal in the support. When Ni is used as the catalytic metal, an Ni salt compound, e.g., nickel(II) nitrate hexahydrate ($Ni(NO_3)_2 \cdot 6H_2O$) can be used. Similarly, when Co and/or Ru is used as the catalytic metal, a salt compound of these metals, e.g., cobalt(II) nitrate hexahydrate ($Co(NO_3)_2 \cdot 6H_2O$) or ruthenium(III) trinitrate ($Ru(NO_3)_3$) can be used.

In the evaporation to dryness method, a surface of a support is brought into contact with a solution in which a catalytic metal source is dissolved, and then, a solvent is removed and a compound of catalytic metals is supported in the support. For example, when Ni and Co are used as the catalytic metals and a nitrate is used as the catalytic metal source, nickel nitrate and cobalt nitrate (or ruthenium nitrate) are supported in the support. Thereafter, nitric acid is removed by heat treatment (e.g., 600° C.) under a reducing atmosphere, and thus, the catalytic metals are supported in the support.

An amount of the catalytic metal supported in the support can be evaluated by ICP emission spectroscopy.

(Water Vapor Reformer)

Figure 4:
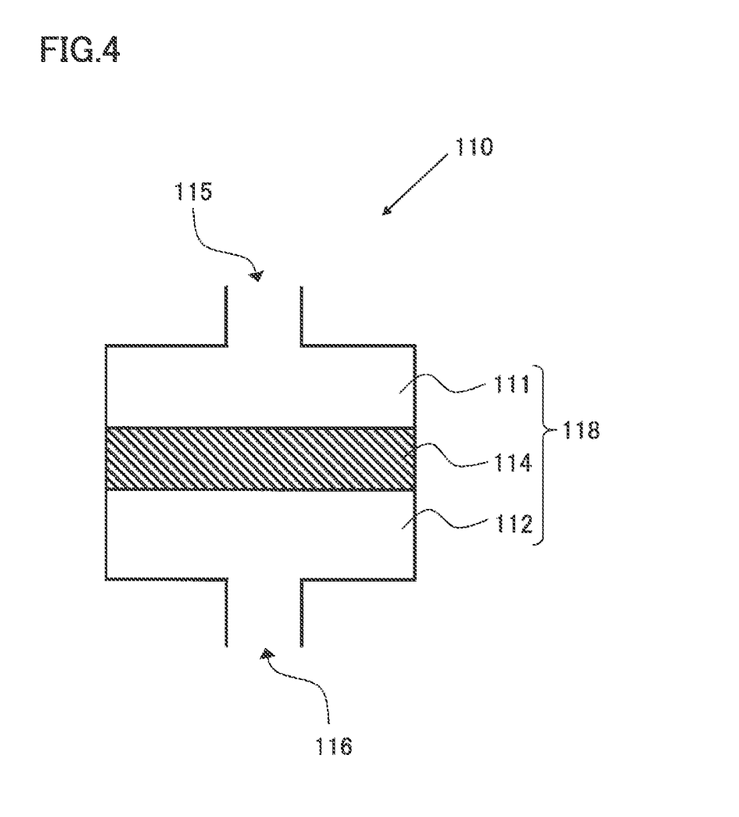
FIG. 4 is a schematic view showing a configuration of a water vapor reformer according to one embodiment of the present disclosure.

A conventionally used configuration such as a cylindrical water vapor reformer can be used as a configuration of a water vapor reformer. FIG. 4 schematically shows an example configuration of a water vapor reformer.

A water vapor reformer 110 generally includes a reaction chamber 118 where a gas containing hydrocarbon is reacted with a water vapor to produce a reforming gas containing hydrogen. A catalyst-supporting metal porous body 114 is housed in reaction chamber 118. Preferably, reaction chamber 118 includes two treatment chambers (first treatment chamber 111 and second treatment chamber 112) and the two treatment chambers are partitioned by catalyst-supporting metal porous body 114. When a gas containing hydrocarbon and a water vapor is supplied to one (first treatment chamber 111) of the treatment chambers through a gas inlet 115, the gas flows toward the other (second treatment chamber 112) of the treatment chambers through first pores of catalyst-supporting metal porous body 114. At this time, a water vapor reforming catalyst arranged in second pores of catalyst-supporting metal porous body 114 promotes a water vapor reforming reaction of hydrocarbon and produces a hydrogen gas from the gas containing hydrocarbon and the water vapor. As a result, the reforming gas containing the hydrogen gas and by-products of the water vapor reforming reaction such as methane, carbon dioxide and carbon monoxide can be taken out of the second treatment chamber through a gas outlet 116.

The reforming gas taken out through gas outlet 116 is supplied to a fuel cell unit described below. Preferably, a hydrogen permeable film is, for example, used to remove carbon dioxide and carbon monoxide from the reforming gas and separate the hydrogen gas from the reforming gas. The separated hydrogen gas can be supplied to the fuel cell unit.

Since the water vapor reforming reaction is an endothermic reaction, the water vapor reformer is preferably provided with a heating unit for heating the reaction chamber. Alternatively, autothermal reforming may be performed, the autothermal reforming being a process of introducing an oxygen gas into a reaction chamber to allow a partial oxidation reaction (exothermic reaction) of a hydrocarbon gas to progress simultaneously with a water vapor reforming reaction.

(Method for Manufacturing Metal Porous Body)

A method for manufacturing the metal porous body will be described in detail below.

First, a template having a three-dimensional network structure is prepared. A porous material that is easily degradable at a temperature equal to or lower than melting points of a first metal and a second metal described below is used as the template. The porous material is preferably a resin porous body. A resin foam, a nonwoven fabric, a felt, a woven fabric, or a combination thereof can be used as the resin porous body.

Among the resin porous body, the resin foam is more preferably used as the template having a three-dimensional network structure. Examples of the resin foam include foamed urethane, foamed styrene and the like. Among these, foamed urethane is preferable because of its high porosity. A thickness, a porosity and an average pore size of the resin foam are set as appropriate in accordance with the properties of the manufactured metal porous body.

Preferably, treatment for making the template electrically conductive may be performed before a first plating step described below, in order to facilitate adhesion of the first metal to the template in the first plating step. A method for the treatment for making the template electrically conductive is not particularly limited as long as it is a method that can provide an electrically conductive coating layer on a surface of the template. Examples of a material that forms the electrically conductive coating layer include amorphous carbon such as carbon black, and carbon powder such as graphite, in addition to metals such as nickel, titanium and stainless steel. Among these, carbon powder is particularly preferable, and carbon black is more preferable. When amorphous carbon or carbon powder other than the metals is used, the electrically conductive coating layer is also removed in the below-described step of removing the template.

For example, when nickel is used, specific examples of the treatment for making the template electrically conductive preferably include electroless plating treatment, sputtering treatment and the like. When the metal such as titanium or stainless steel, carbon black, graphite or the like is used, specific examples of the treatment for making the template electrically conductive include treatment for adding a binder to a fine powder of these materials to obtain a mixture and applying the mixture to a surface of the resin porous body.

As an example of the electroless plating treatment using nickel, the resin porous body may be immersed in a known electroless nickel plating bath such as a nickel sulfate aqueous solution containing sodium hypophosphite as a reducing agent. As needed, before immersion in the plating bath, the template may be immersed in an activation liquid (cleaning liquid manufactured by Kanigen Co., Ltd.) containing a very small amount of palladium ions, or the like.

As an example of the sputtering treatment using nickel, the template may be mounted on a substrate holder, and then, a DC voltage may be applied between the holder and a target (nickel) while introducing an inert gas, to thereby bring the ionized inert gas into collision with nickel and deposit the blown-off nickel particles on the surface of the resin porous body.

The electrically conductive coating layer may be continuously formed on the surface of the template. An amount of coating of the electrically conductive coating layer is not particularly limited, and may be normally approximately 0.1 $g/m^2$ to 20 $g/m^2$, and preferably approximately 0.5 $g/m^2$ to 5 $g/m^2$.

(First Plating Step)

Next, the template having a three-dimensional network structure is plated with the first metal, to thereby coat the template with a first plated layer. A method for plating with the first metal is not particularly limited as long as it is the step of providing metal plating using a known plating method. However, an electroplating method is preferably used. The electroplating treatment may be performed in accordance with an ordinary method. For example, in the case of nickel plating, a known or commercially available plating bath can be used as a plating bath, and examples of the plating bath include a watt bath, a chloride bath, a sulfamic acid bath and the like.

By immersing the template having the electrically conductive coating layer formed on the surface thereof in the plating bath, and connecting the template to a negative electrode and a counter electrode plate of the first metal to a positive electrode to allow a DC or pulse intermittent current to pass, the electrically conductive coating layer can be further coated with the first plated layer.

When the electrically conductive coating layer is formed, the first plated layer may be formed on the electrically conductive coating layer to the extent of not exposing the electrically conductive coating layer. An amount of coating of the first plated layer is not particularly limited, and may be normally approximately 100 $g/m^2$ to 600 $g/m^2$, and preferably approximately 200 $g/m^2$ to 500 $g/m^2$.

(Second Plating Step)

Next, the template subjected to the first plating step is plated with the second metal, to thereby coat the first plated layer with a second plated layer. Similarly to the first plating step, a method for plating with the second metal is not particularly limited as long as it is the step of providing metal plating using a known plating method. However, an electroplating method is preferably used. The electroplating method may be performed in accordance with an ordinary method.

An amount of coating of the second plated layer is not particularly limited, and may be normally approximately 10 $g/m^2$ to 300 $g/m^2$, and preferably approximately 20 $g/m^2$ to 250 $g/m^2$.

(Step of Attaching Microspheres)

In the first plating step and/or the second plating step, microspheres are attached to the surface of the template, together with the first metal or the second metal. This can be performed by floating the microspheres in a plating liquid and performing plating treatment using the plating liquid in which the microspheres are dispersed in the plating step. By the plating treatment, the microspheres are attached to the surface, together with the first metal or the second metal, and in some cases, plating is performed in a state where the microspheres are incorporated into the metal. Thereafter, the microspheres are removed, to thereby form second pores in an outer layer of a skeleton of the metal porous body.

A surfactant that forms a spherical micelle in an aqueous solution can, for example, be used as the microspheres. Examples of the surfactant include a cation surfactant of a quaternary ammonium salt such as distearyldimethylammonium chloride or benzalkonium chloride. Inorganic or organic microspheres that are insoluble in the plating liquid can also be used.

The microspheres are uniformly dispersed in the plating liquid by stirring and the like, and is used.

A concentration of the microspheres in the first plated layer or the second plated layer is not particularly limited. In order to increase a surface area, the concentration of the microspheres is preferably approximately not less than 0.01 mol/L and not more than 0.1 mol/L when the surfactant is used as the microspheres.

The step of attaching the microspheres may be performed in the first plating step, or may be performed in the second plating step. When the microspheres are attached in the first plating step, the microspheres are removed after completion of the first plating step, and the second plating step is performed after removal of the microspheres. In the second plating step, the microspheres may be attached again.

In order to increase the mechanical strength of the metal porous body, the step of attaching the microspheres is preferably performed in the second plating step. Since no pores are formed in the first plated layer that forms the skeleton, high strength is obtained. However, in order to reduce a weight of the metal porous body, the step of attaching the microspheres is preferably performed in the first plating step.

When the microspheres are attached in the second plating step, the first metal (first plated layer) may in some cases be exposed on surfaces of the second pores formed by removal of the microspheres. However, when the microspheres are attached only in the first plating step, the entire surfaces of the second pores are coated with the second metal (second plated layer) and the first metal is not exposed.

Therefore, by attaching the microspheres only in the first plating step and performing plating with a metal excellent in corrosion resistance, such as Sn or Cr, as the second metal in the second plating step, a reduction in weight and an increase in corrosion resistance can be achieved.

Since the microspheres are for forming the second pores in the outer layer portion of the skeleton of the metal porous body, a size of the second pores is determined depending on a size of the microspheres. When the microspheres are attached in the second plating step, the size (pore size) of the second pores is at the same level as the size (diameter) of the microspheres. In contrast, when the microspheres are attached in the first plating step, a value obtained by subtracting the thickness of the second plated layer from the size (diameter) of the microspheres is mostly defined as the size (pore size) of the second pores. When the microspheres are attached in both the first plating step and the second plating step, there may be two types of second pores, i.e., one type of second pores located on the surface side of the skeleton of the metal porous body and having a pore size that is at the same level as the size (diameter) of the microspheres, and the other type of second pores located on the more inner side of the skeleton of the metal porous body and having a pore size smaller by the thickness of the second plated layer than the size (diameter) of the microspheres.

The pore size of the second pores is preferably 0.2 μm to 20 μm. The microspheres having a suitable size can be selected and used such that the second pores have the desired pore size.

(Step of Forming Metal Porous Body)

Thereafter, the microspheres and the template are removed, to form a metal porous body. The step of removing the microspheres and the step of removing the template may be performed separately, or may be performed simultaneously.

The strong intermolecular force such as covalent bond or hydrogen bond is not formed between the microspheres and the metal plating. Therefore, the microspheres can be removed by performing water washing treatment after the plating steps.

Next, the template can be removed by placing the template under an oxidizing atmosphere such as air of not lower than 600° C. and not higher than 800° C., and preferably not lower than 600° C. and not higher than 700° C. By the heat treatment under the oxidizing atmosphere, the microspheres remaining in the metal porous body are also removed together with the template.

It is preferable to remove the microspheres and the template by the heat treatment under the oxidizing atmosphere, and then, subject the obtained metal porous body to heat treatment under a reducing atmosphere. It is desirable that a heat treatment temperature should be as high as possible. However, in view of the manufacturing cost and a furnace body material of a reducing furnace, the heat treatment temperature is preferably not lower than 750° C. and not higher than 1000° C.

In order to keep the strength of the metal porous body high, an amount of plating in the first plating step (amount of coating of the first plated layer) is preferably set to be larger than an amount of plating in the second plating step (amount of coating of the second plated layer). As a result, the skeleton portion of the metal porous body can be made thicker than a portion of the outer layer having the second pores, and thus, the strength of the metal porous body can be kept. In order to increase the strength of the metal porous body, it is preferable not to attach the microspheres in the first plating step and to attach the microspheres only in the second plating step.

The first metal in the first plating step and the second metal in the second plating step may be the same as each other, or may be different from each other. Each of the first metal and the second metal is not limited to a metal including only a single metal element, and may be an alloy composed of a plurality of metal elements.

It is preferable that the first metal should include Ni and the second metal should include Sn or Cr. By performing Ni plating and then Sn or Cr plating, the metal porous body excellent in corrosion resistance is obtained.

In the case of the metal porous body having an Sn plated layer formed on an Ni plated layer, Ni in the Ni plated layer diffuses into the Sn plated layer by the heat treatment under the reducing atmosphere, and an Ni—Sn alloy layer is thus formed on at least the outer layer of the skeleton of the metal porous body. The Ni—Sn alloy layer may be formed on the entire skeleton of the metal porous body. The Ni—Sn alloy layer has high heat resistance and corrosion resistance (oxidation resistance). In order to form the Ni—Sn alloy layer on at least the outer layer, a thickness (amount of coating) of the Sn plated layer may be a thickness that allows Ni to diffuse into the outer layer of the Sn plated layer.

However, in order to obtain sufficient corrosion resistance, the amount of coating of the Sn plated layer is preferably equal to or more than 4% of an amount of coating of the Ni plated layer.

The Ni—Sn alloy layer may be formed on the Ni plated layer by plating.

Sn plating can be performed using a plating liquid containing sulfuric acid and stannous sulfate. Cr plating can be performed using a plating liquid mainly composed of chromic acid anhydride and containing sulfuric acid. The plating liquid may contain fluoride such as sodium silicofluoride.

The Ni—Sn alloy layer can be formed by, for example, electroplating treatment using a plating liquid containing stannous chloride, nickel chloride and potassium pyrophosphate.

When Ni plating is performed in the first plating step and/or the second plating step, the used plating liquid is preferably a plating liquid mainly composed of a nickel sulfamate plating liquid. The nickel sulfamate plating liquid is small in plating stress and excellent in coverage, and thus, the flexibility can be ensured even in an intermediate product before heat treatment, and problems such as a break in a manufacturing process can be suppressed.

(Step of Supporting Water Vapor Reforming Catalyst)

Next, a water vapor reforming catalyst is supported in a surface of the metal porous body. This can be performed by immersing the metal porous body in slurry containing a powder of the water vapor reforming catalyst and pulling up the metal porous body, and then, drying the metal porous body. Examples of a solvent of the slurry include water, ethanol, an organic solvent and the like. A dispersant and/or an organic binder may be contained in the slurry. Preferably, the slurry containing the dispersant and the organic binder such that a total of the dispersant and the organic binder is not less than 1 mass % and not more than 15 mass % with respect to the entire slurry is easy to use. A known dispersant and a known organic binder that are used for formation of a solid electrolyte layer of a fuel cell can be used as the dispersant and the organic binder.

When an average particle size of the water vapor reforming catalyst is larger than the pore size of the second pores, the water vapor reforming catalyst is preliminarily pulverized using a mortar, a ball mill, a bead mill or the like to preliminarily reduce the average particle size of the water vapor reforming catalyst to be equal to or less than the size of the second pores before bringing the water vapor reforming catalyst into contact with the metal porous body, such that the water vapor reforming catalyst can be supported in the second pores. The average particle size of the water vapor reforming catalyst is preferably equal to or less than a half of the pore size of the second pores, and more preferably equal to or less than one-fifth of the pore size of the second pores. As used herein, the average particle size refers to a median value (D50) at a cumulative value of 50% in a volume particle-size distribution of a particle size measured by a laser diffraction/scattering method.

(Configuration of Fuel Cell)

Figure 5:
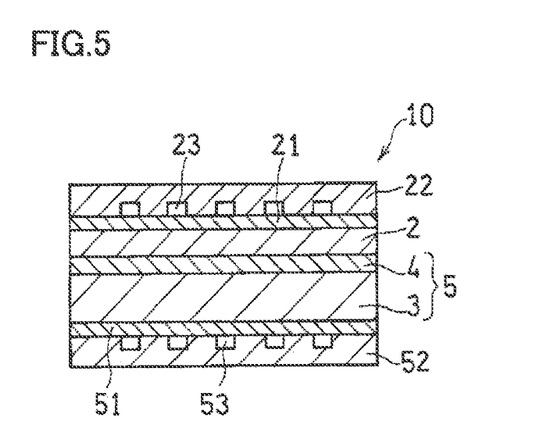
FIG. 5 is a cross-sectional view schematically showing a fuel cell used together with the water vapor reformer according to one embodiment of the present disclosure.

FIG. 5 schematically shows a cross-sectional structure of a fuel cell unit (solid oxide-type fuel cell unit) used together with the water vapor reformer including the catalyst-supporting metal porous body according to the present embodiment.

Figure 6:
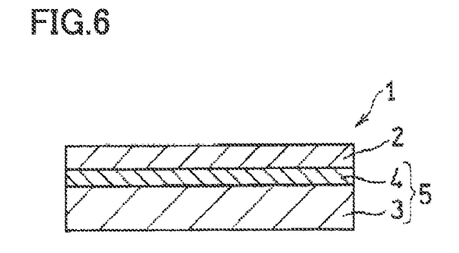
FIG. 6 is a cross-sectional view schematically showing a cell structure included in the fuel cell in FIG. 5.

A fuel cell unit 10 includes a cell structure 1. An example cross-sectional structure of the cell structure is schematically shown in FIG. 6. As shown in FIG. 6, cell structure 1 includes a cathode 2, an anode 3, and a solid electrolyte layer 4 interposed therebetween. In the illustrated example, anode 3 and solid electrolyte layer 4 are integrated to form an electrolyte layer-electrode assembly 5.

In addition to cell structure 1, fuel cell unit 10 includes an oxidant flow path 23 through which an oxidant is supplied to the cathode, a fuel flow path 53 through which a fuel is supplied to the anode, a cathode-side separator 22, and an anode-side separator 52, as shown in FIG. 5. In the example shown in FIG. 5, oxidant flow path 23 is formed by cathode-side separator 22, and fuel flow path 53 is formed by anode-side separator 52. Cell structure 1 is sandwiched between cathode-side separator 22 and anode-side separator 52. Oxidant flow path 23 of cathode-side separator 22 is arranged to face cathode 2 of cell structure 1, and fuel flow path 53 of anode-side separator 52 is arranged to face anode 3.

Each component of the fuel cell unit will be further described below.

(Solid Electrolyte Layer)

A solid electrolyte layer having proton conductivity or oxygen ion conductivity in an intermediate temperature range of 400° C. to 600° C. is used as the solid electrolyte layer. For example, perovskite oxides such as $BaCe_{0.8}Y_{0.2}O_{2.9}$ (BCY) and $BaZr_{0.8}Y_{0.2}O_{2.9}$ (BZY) can be used as a solid electrolyte for an intermediate temperature-type fuel cell because they exhibit high proton conductivity in an intermediate temperature range. The above-described solid electrolyte can be formed by, for example, sintering.

A thickness of the solid electrolyte layer is, for example, 1 μm to 50 μm, and preferably 3 μm to 20 μm. When the thickness of the solid electrolyte layer is within this range, a resistance of the solid electrolyte layer is low. Therefore, the solid electrolyte layer having a thickness within this range is preferable.

The solid electrolyte layer forms the cell structure together with the cathode and the anode, and can be incorporated into a fuel cell. In the cell structure, the solid electrolyte layer is sandwiched between the cathode and the anode, and one main surface of the solid electrolyte layer is in contact with the anode and the other main surface is in contact with the cathode.

(Cathode)

The cathode has a porous structure. When the solid electrolyte layer having proton conductivity is used, a reaction (reduction reaction of oxygen) of protons conducted through the solid electrolyte layer and oxide ions progresses in the cathode. The oxide ions are produced by dissociation of the oxidant (oxygen) introduced through the oxidant flow path.

A known material can be used as a cathode material. As the cathode material, compounds (such as ferrite, manganite and/or cobaltite) containing lanthanum and having a perovskite structure are, for example, preferable, and among these compounds, a compound further containing strontium is more preferable. Specific examples include lanthanum strontium cobalt ferrite (LSCF, $La_{1-x1}Sr_{x1}Fe_{1-y1}Co_{y1}O_{3-\delta1}$, where $0<x1<1$, $0<y1<1$ and δ1 represents an amount of oxygen deficiency), lanthanum strontium manganite (LSM, $La_{1-x2}Sr_{x2}MnO_{3-\delta1}$, where $0<x2<1$ and δ1 represents an amount of oxygen deficiency), lanthanum strontium cobaltite (LSC, $La_{1-x3}Sr_{x3}CoO_{3-\delta1}$, where $0<x3\leq1$ and δ1 represents an amount of oxygen deficiency), and the like. In order to promote the reaction of the protons and the oxide ions, the cathode may include a catalyst such as Pt. When the cathode includes the catalyst, the cathode can be formed by mixing and sintering the catalyst and the above-described material.

The cathode can be formed by, for example, sintering a raw material of the above-described material. In addition to the raw material, a binder, an additive and/or a dispersion medium may be used as needed.

A thickness of the cathode is not particularly limited, and can be selected as appropriate from, for example, 5 μm to 2 mm, and may be approximately 5 μm to 40 μm.

(Anode)

The anode has a porous structure. A reaction (oxidation reaction of the fuel) of oxidizing the fuel such as hydrogen introduced through the fuel flow path and emitting protons and electrons progresses in the anode.

A known material can be used as an anode material. Examples of the anode material include a composite oxide of nickel oxide (NiO) serving as a catalyst component and a proton conductor (such as yttrium oxide ($Y_2O_3$), BCY or BZY).

The anode can be formed by, for example, sintering a raw material. For example, the anode can be formed by sintering a mixture of an NiO powder and a proton conductor powder or the like.

A thickness of the anode can be selected as appropriate from, for example, 10 μm to 2 mm, and may be 10 μm to 100 μm.

In FIGS. 5 and 6, the thickness of anode 3 is larger than the thickness of cathode 2 and anode 3 functions as a support that supports solid electrolyte layer 4 (and in turn cell structure 1). The thickness of anode 3 does not necessarily need to be larger than the thickness of cathode 2, and the thickness of anode 3 may be at the same level as the thickness of cathode 2, for example.

In the illustrated example, the anode and the solid electrolyte layer are integrated. However, the present invention is not limited to this case. The cathode and the solid electrolyte layer may be integrated to form an electrolyte layer-electrode assembly.

Oxidant flow path 23 includes an oxidant inlet through which the oxidant flows in, and an oxidant outlet through which water produced as a result of reaction, the unused oxidant and the like are discharged (both are not shown). Examples of the oxidant include a gas containing oxygen. Fuel flow path 53 includes a fuel gas inlet through which the fuel gas flows in, and a fuel gas outlet through which the unused fuel, $H_2O$, $N_2$ and $CO_2$ produced as a result of reaction, and the like are discharged (both are not shown). Examples of the fuel gas include a gas containing a gaseous body such as hydrogen, methane, ammonia, or carbon monoxide.

Fuel cell unit 10 may include a cathode-side current collector 21 arranged between cathode 2 and cathode-side separator 22, and an anode-side current collector 51 arranged between anode 3 and anode-side separator 52. In addition to the current collection function, cathode-side current collector 21 has the function of spreading the oxidant gas introduced through oxidant flow path 23 across cathode 2 and supplying the oxidant gas to cathode 2. In addition to the current collection function, anode-side current collector 51 has the function of spreading the fuel gas introduced through fuel flow path 53 across anode 3 and supplying the fuel gas to anode 3. Therefore, each current collector is preferably a structure having sufficient air permeability. Current collectors 21 and 51 do not necessarily need to be provided in fuel cell unit 10.

Since fuel cell unit 10 includes a solid electrolyte having proton conductivity, fuel cell unit 10 can operate in an intermediate temperature range of less than 700° C., and preferably approximately 400° C. to 600° C.

(Separator)

When a plurality of cell structures are stacked to form a fuel cell, cell structure 1, cathode-side separator 22 and anode-side separator 52 are stacked as one unit, for example. A plurality of cell structures 1 may be connected in series by a separator including gas flow paths (an oxidant flow path and a fuel flow path) on both sides thereof, for example.

In terms of proton conductivity and heat resistance, examples of a material of the separator can include a heat-resistant alloy such as stainless steel, a nickel-based alloy or a chromium-based alloy. Among these, stainless steel is preferable because of its inexpensiveness. An operation temperature of a protomic ceramic fuel cell (PCFC) is approximately 400° C. to 600° C., and thus, stainless steel can be used as the material of the separator.

(Current Collector)

Examples of the structure used as each of the cathode-side current collector and the anode-side current collector include a metal porous body including silver, a silver alloy, nickel, a nickel alloy or the like, a metal mesh, a punched metal, an expanded metal and the like. Among these, the metal porous body is preferable because of its lightness and air permeability. Particularly, a metal porous body having a three-dimensional network-like structure is preferable. The three-dimensional network-like structure refers to a structure in which rod- or fiber-shaped metals forming a metal porous body are connected to each other in a three-dimensional manner to form a network. Examples of the three-dimensional network-like structure include a sponge-like structure and a nonwoven fabric-like structure.

The metal porous body can be formed by, for example, coating a resin porous body having connected voids with the above-described metal. When the resin within the porous body is removed after the metal coating treatment, cavities are formed within a skeleton of the metal porous body and the skeleton becomes hollow. As a commercially available metal porous body having such a structure, nickel "Celmet manufactured by Sumitomo Electric Industries, Ltd. can, for example, be used.

The fuel cell can be manufactured using a known method, except that the above-described cell structure is used.

The metal porous body having the water vapor reforming catalyst supported therein according to the present embodiment can also be used as the current collector. The catalyst-supporting metal porous body may be used in anode-side current collector 51. Alternatively, the catalyst-supporting metal porous body may be arranged between anode-side current collector 51 and anode 3 or between anode-side separator 52 and anode-side current collector 51. As a result, the gas containing hydrocarbon can be supplied to fuel flow path 53, water vapor reforming can be performed in the fuel cell unit, and the hydrogen gas serving as the fuel can be supplied to the anode. In this case, the water vapor reformer provided outside becomes unnecessary.

Example

The present disclosure will be specifically described below based on Example. However, the present invention is not limited to Example described below.

(1) Production of Water Vapor Reforming Catalyst

Predetermined amounts of lanthanum(III) nitrate hexahydrate, strontium nitrate and niobium oxide are weighed and then mixed, to thereby prepare an aqueous solution. Thereafter, the aqueous solution is heated to 80° C., and is dried to evaporate water while being stirred. Next, heat treatment is performed at 400° C. for five hours under an air atmosphere, and then, heat treatment is performed at 1000° C. for ten hours under an air atmosphere, to thereby synthesize $La_{0.9}Sr_{0.1}NbO_4$. The synthesized product is pulverized using a mortar, a ball mill, a bead mill or the like, to thereby obtain a $La_{0.9}Sr_{0.1}NbO_4$ powder having an average particle size of 1 μm or less.

The obtained $La_{0.9}Sr_{0.1}NbO_4$ powder is put into an aqueous solution obtained by mixing a predetermined amount of nickel(II) nitrate hexahydrate with a predetermined amount of cobalt(II) nitrate hexahydrate. At this time, a concentration of nickel nitrate and a concentration of cobalt nitrate in the aqueous solution are adjusted such that a total of Ni and Co included in the water vapor reforming catalyst subjected to drying and heat treatment is 3 parts by mass, with a total of $La_{0.9}Sr_{0.1}NbO_4$ and Ni and Co being 100 parts by mass. A content ratio of Co is 10 parts by mass, with a total of Ni and Co being 100 parts by mass.

Thereafter, the aqueous solution is heated to 80° C., and is dried to evaporate water while being stirred, to thereby obtain a catalyst powder. The dried catalyst powder is particle-size regulated using a mesh and is subjected to heat treatment at 600° C. for two hours under a hydrogen-containing atmosphere, to thereby obtain a water vapor reforming catalyst.

(2) Production of Metal Porous Body

A polyurethane sheet having a thickness of 1.5 mm is used as a template. 100 g of carbon black, which is amorphous carbon having a particle size of 0.01 μm to 0.2 μm is dispersed in 0.5 L of a 10 mass % acrylic ester-based resin aqueous solution, to thereby produce adhesive paint at this ratio. Next, the polyurethane template is impregnated with the adhesive paint, squeezed using a roll, and then dried. As a result, an electrically conductive coating layer is formed on a surface of the polyurethane template.

Thereafter, using the electroplating method, 600 g/m² of nickel is attached to the polyurethane template subjected to treatment for making the polyurethane template electrically conductive, to thereby form a first plated layer. A nickel sulfamate plating liquid is used as a plating liquid.

Furthermore, the polyurethane template plated with nickel is subjected to second metal plating. A plating liquid containing sulfuric acid and stannous sulfate and having benzalkonium chloride floated therein is used as a plating liquid. In this case, benzalkonium chloride is micellized in the plating liquid to form spherical particles having a particle size of approximately 0.2 μm to 5 μm. The plating liquid is stirred to uniformly disperse microspheres in the plating liquid, and then, plating is performed.

An amount of coating of Sn is 50 g/m².

After the plating step, water washing treatment is performed to remove the microspheres. Next, the template plated with nickel and tin is heated to 650° C. under an air oxidizing atmosphere, to thereby remove the polyurethane template. Next, a reducing atmosphere is formed using a reducing gas including a mixture of nitrogen and hydrogen, and reducing treatment is performed at 1000° C.

As a result of the above-described process, a metal porous body having second pores in at least an outer layer portion of a skeleton is produced.

Thereafter, the metal porous body is immersed in slurry including the water vapor reforming catalyst, is pulled up, and then is dried. Thereafter, heat treatment is further performed at 400° C. for two hours under a hydrogen atmosphere, to thereby obtain a metal porous body having the water vapor reforming catalyst supported therein (hereinafter, referred to as "catalyst-supporting metal porous body"). The catalyst-supporting metal porous body is mounted on a circulating fixed-bed-type water vapor reformer.

(3) Evaluation

A mixed gas containing $C_3H_8$ and $N_2$ at a molar ratio of $C_3H_8:N_2=1:9$ and a water vapor ($H_2O$) gas are mixed at a flow velocity ratio of 30.8 cc/min:32.6 cc/min, and the mixed gas containing $C_3H_8$, $H_2O$ and $N_2$ is supplied to a reaction tube of the water vapor reformer such that a total flow velocity is 63.4 cc/min.

A gas composition after reaction is analyzed by TCD-type and FID-type gas chromatography. Masses of $C_3H_8$, $H_2O$, $H_2$, $CH_4$, $CO_2$, and CO contained in the gas (reforming gas) after reaction are measured and summed up, and the sum is subtracted from a total mass of $C_3H_8$ and $H_2O$ contained in the gas (supplied gas) before reaction. An amount of production of C (carbon) after reaction is determined by a mass after subtraction. A $C_3H_8$ conversion rate (%), an $H_2$ production rate (μmol/min), and selection rates and yields (%) of $CH_4$, $CO_2$, CO, and C are evaluated.

In the catalyst-supporting metal porous body, a high $C_3H_8$ conversion rate is obtained and the amount of production of C (carbon) is also reduced at intermediate and low temperatures of 600° C. to 800° C.

INDUSTRIAL APPLICABILITY

The metal porous body according to the embodiment of the present disclosure is suitable for use in a water vapor reformer that supplies a fuel gas to an SOFC that operates in an intermediate temperature range of 600° C. to 800° C. or in a lower temperature range of 400° C. to 600° C.

REFERENCE SIGNS LIST

1 cell structure; 2 cathode; 3 anode; 4 solid electrolyte layer; 5 electrolyte layer-electrode assembly; 10 fuel cell unit; 21, 51 current collector; 22, 52 separator; 23 oxidant flow path; 53 fuel flow path; 101 first pore; 102 fiber member; 102a hollow portion; 102b outer layer portion; 102c outer surface; 102d inner layer portion; 102e inner surface; 103 opening; 104 second pore; 110 water vapor reformer; 111, 112 treatment chamber; 114 catalyst-supporting metal porous body; 115 gas inlet; 116 gas outlet; 118 reaction chamber.

The invention claimed is:

1. A metal porous body having a skeleton of a three-dimensional network structure, an outer layer portion of the skeleton having second pores smaller in size than first pores formed by the skeleton,
   wherein the outer layer portion is a metal layer,
   a water vapor reforming catalyst is supported in the outer layer portion,
   the metal layer includes a first metal and a second metal,
   the first metal includes Ni, and
   the second metal includes Sn.

2. The metal porous body according to claim 1, wherein the metal layer includes an alloy layer of the first metal and the second metal, and
   a first phase and a second phase coexist in the alloy layer, the first phase and the second phase being different in concentration of the second metal with respect to the first metal.

3. The metal porous body according to claim 1, wherein a porosity is 70 to 98%.

4. The metal porous body according to claim 1, wherein the first pores have a pore size of 100 μm to 4000 μm.

5. The metal porous body according to claim 1, wherein the second pores have a pore size of 0.2 μm to 20 μm.

6. The metal porous body according to claim 1, wherein the water vapor reforming catalyst includes a metal catalyst including Ni, and a support supporting the metal catalyst,
   the metal catalyst further includes at least one selected from the group consisting of Co and Ru, and
   the support is $LaNbO_4$ or $La_{1-x}Sr_xNbO_4$, where x is greater than 0 and equal to or less than 0.12.

7. A water vapor reformer comprising:
   a reaction chamber where a gas containing hydrocarbon is reacted with a water vapor to produce a reforming gas containing hydrogen; and
   the metal porous body as recited in claim 1,
   wherein the metal porous body is housed in the reaction chamber.

8. The water vapor reformer according to claim 7, wherein a reaction temperature of a water vapor reforming reaction is 600° C. to 800° C.

9. A method for manufacturing the metal porous body as recited in claim 1, the method comprising:
   a first plating step of plating a template having a three-dimensional network structure with a first metal;
   a second plating step of plating the template subjected to the first plating step with a second metal;
   in the first plating step and/or the second plating step, attaching microspheres to a surface of the template together with the first metal or the second metal;
   removing the microspheres and the template, to form a metal porous body; and
   supporting a water vapor reforming catalyst in a surface of the metal porous body.

10. The method for manufacturing the metal porous body according to claim 9, wherein the attaching microspheres is performed in the second plating step.

11. The method for manufacturing the metal porous body according to claim 9, wherein the attaching microspheres is performed in the first plating step, and the second plating step is performed after the removing the microspheres.

12. The method for manufacturing the metal porous body according to claim 9, wherein in the forming a metal porous body, heat treatment is performed under a reducing atmosphere, to form an alloy layer of the first metal and the second metal on at least an outer layer of the metal porous body.

* * * * *